Feb. 9, 1954 W. H. KORN 2,668,739

LUBRICATING DEVICE

Filed July 11, 1950 5 Sheets-Sheet 1

INVENTOR.
Waldemar H. Korn
BY Sheridan, Davis and Cargill Att'ys

Feb. 9, 1954

W. H. KORN 2,668,739

LUBRICATING DEVICE

Filed July 11, 1950

5 Sheets-Sheet 2

INVENTOR.
Waldemar H. Korn
BY
Sheridan, Davis & Cargill
Att'ys

LUBRICATING DEVICE

Filed July 11, 1950

INVENTOR.
Waldemar H. Korn
BY Sheridan, Davis and Cargill
Att'ys

Feb. 9, 1954

W. H. KORN 2,668,739

LUBRICATING DEVICE

Filed July 11, 1950

5 Sheets-Sheet 4

INVENTOR.
Waldemar H. Korn
BY
Sheridan, Davis & Cargill
Att'ys

Feb. 9, 1954 W. H. KORN 2,668,739

LUBRICATING DEVICE

Filed July 11, 1950 5 Sheets-Sheet 5

INVENTOR.
Waldemar H. Korn
BY
Sheridan, Davis & Cargill
Att'ys

Patented Feb. 9, 1954 2,668,739

UNITED STATES PATENT OFFICE

2,668,739

LUBRICATING DEVICE

Waldemar H. Korn, Dubuque, Iowa, assignor to Kornlube Products, Highland Park, Ill., a co-partnership

Application July 11, 1950, Serial No. 173,057

28 Claims. (Cl. 308—88)

1

This invention relates to improvements in lubricating devices and has for an object to provide such a device particularly adapted to the lubrication of railway car or locomotive axles by replacement of the present-day conventional waste packing lubricating means.

Another object consists in the provision of such a device constructed and arranged for easy insertion into and removal from a journal box.

Another object consists in the provision of such a device which includes lubricating pad units which may be easily and conveniently inserted into or removed from a journal box without removal of the carrying means.

Another object consists in the provision of such a device so constructed as to provide adequate support and retention of a lubricator pad and for ease of assembly of the associated elements.

Another object consists in the provision and use of a fabric for the lubricating pad which is possessed of a high order of capillarity to insure an adequate supply of lubricating fluid to an axle, particularly at high speeds and/or under a heavy load.

Other objects will become apparent and made clear in the following specification and accompanying drawings in which:

Fig. 11 is a view similar to Fig. 7 showing the

Figure 12:
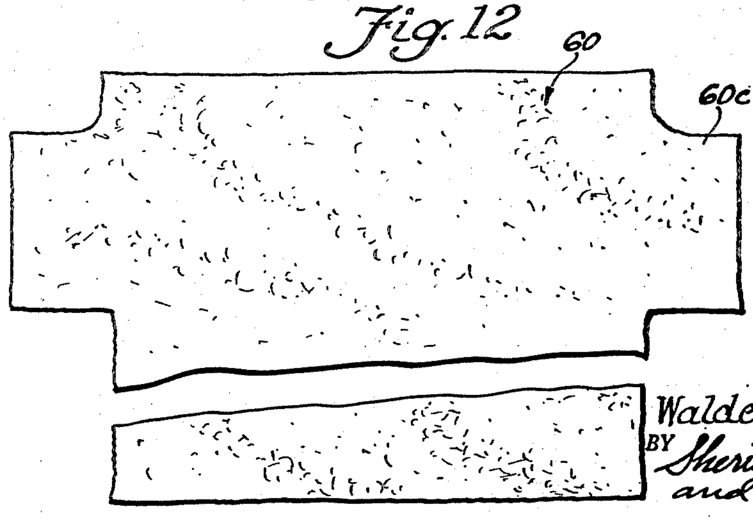
Figure 13:
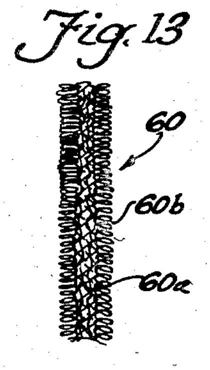
Figure 14:
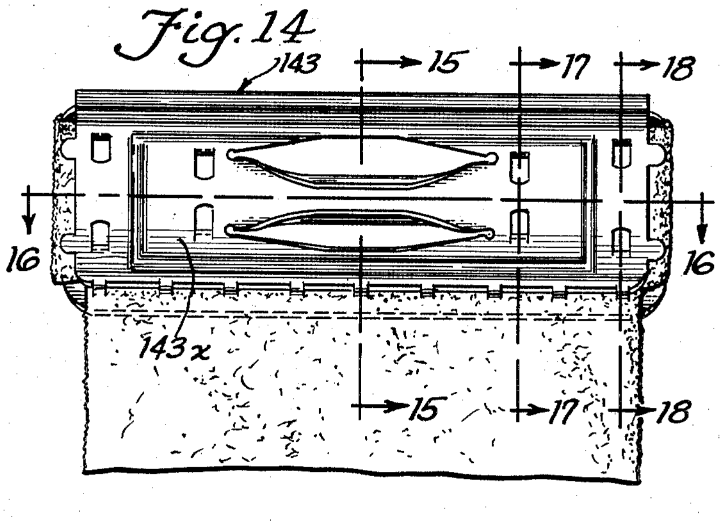
Figure 15:
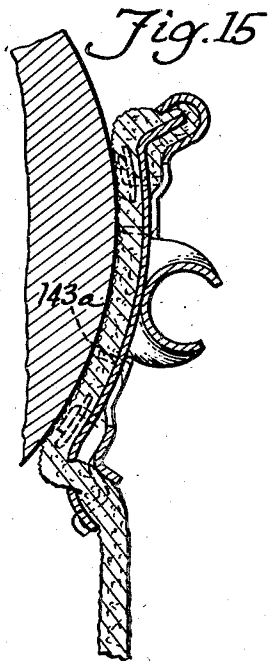
Figure 16:
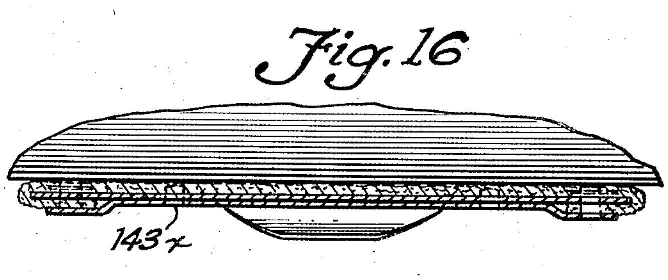
Figure 17:
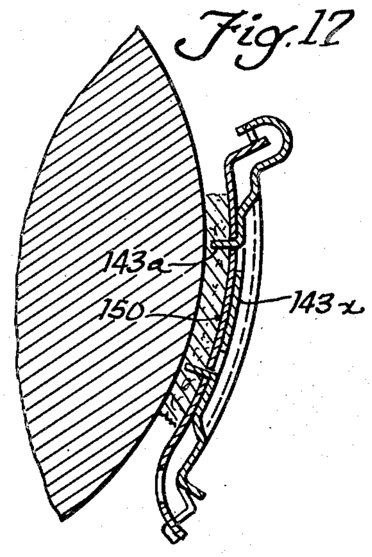
Figure 18:
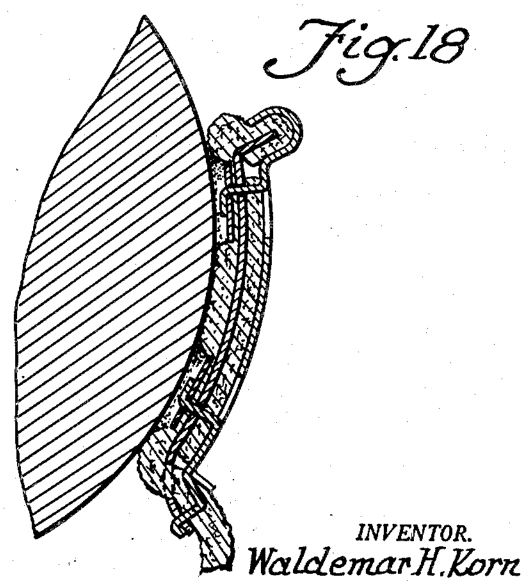
Figures 19, 20, 21, 22:
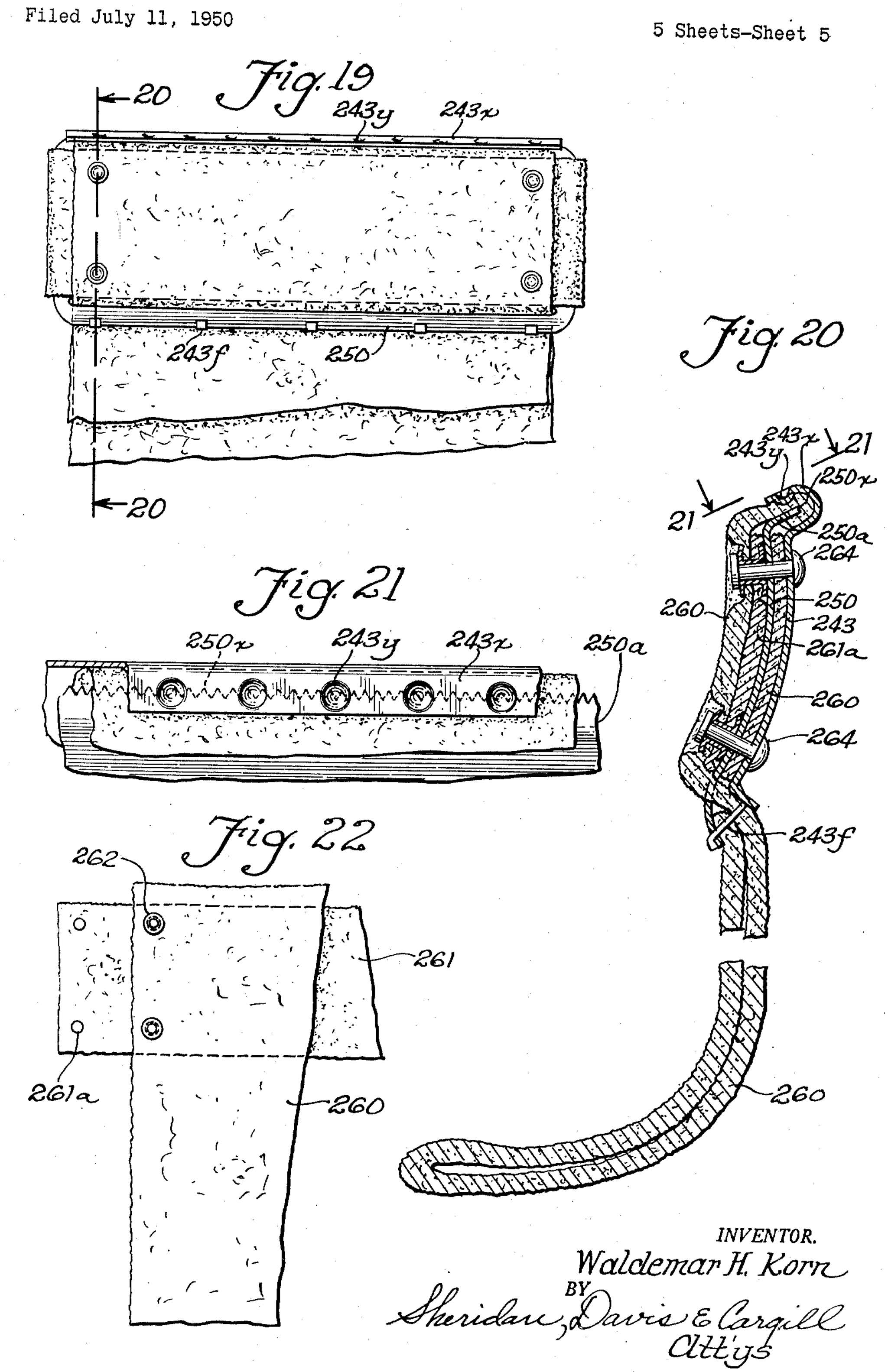

2 retainer plate in relation to an indicated portion of a car axle;

Fig. 12 is a plan view of the fabric blank constituting the lubricator pad;

Fig. 13 is a vertical section through a portion of such pad member;

Fig. 14 is a side elevation of a modified form of pad unit;

Fig. 15 is a section along the line 15—15 of Fig. 14, drawn to an enlarged scale;

Fig. 16 is a horizontal section along the line 16—16 of Fig. 14 also drawn to an enlarged scale;

Fig. 17 is a vertical section along the line 17—17 of Fig. 14 also drawn to an enlarged scale;

Fig. 18 is a view similar to Fig. 17, along the line 18—18 of Fig. 14;

Fig. 19 is a front elevation of a modified pad construction;

Fig. 20 is a vertical section taken along line 20—20 of Fig. 19 drawn to a large scale;

Fig. 21 is a plan view of a portion of the modified pad as viewed from line 21—21 of Fig. 20;

Fig. 22 is a front elevation of a portion of the integrated fabric used in my modified pad construction.

Figure 1:
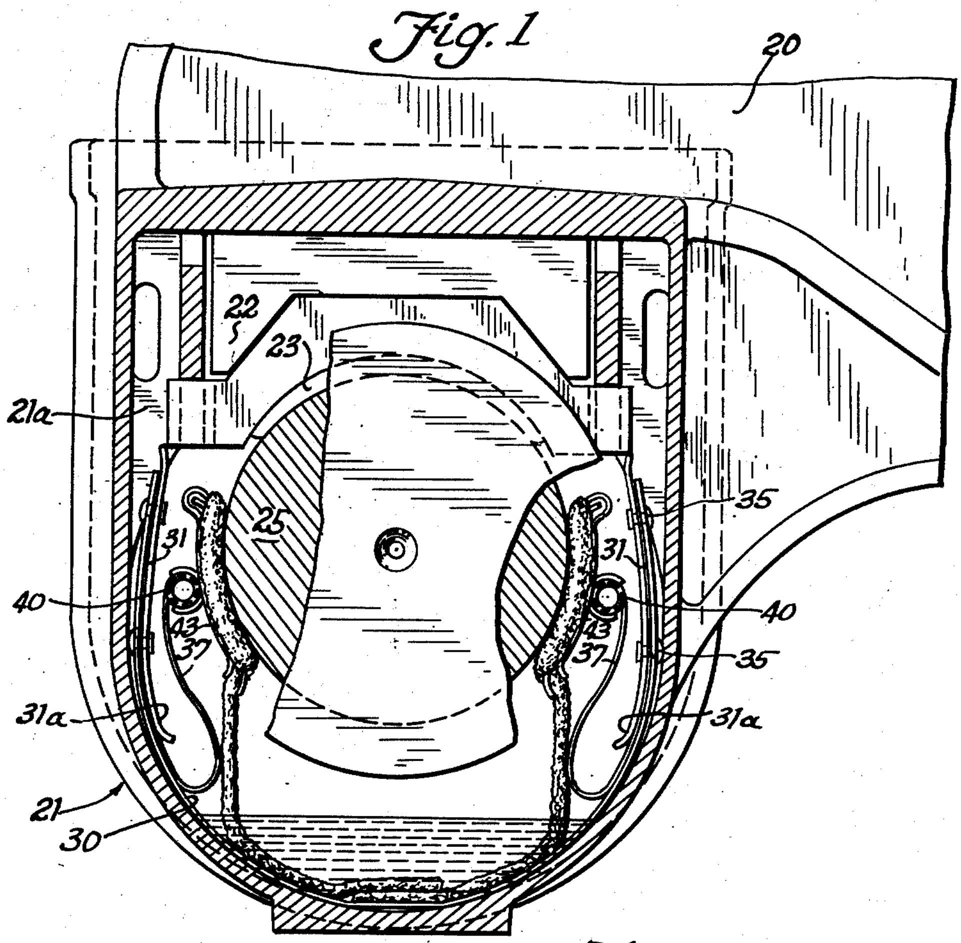
Figure 1 is an end view of a railway car axle, bearing and enclosing journal box, partially in section, showing one form of my lubricating device in operative position.
Figure 2:
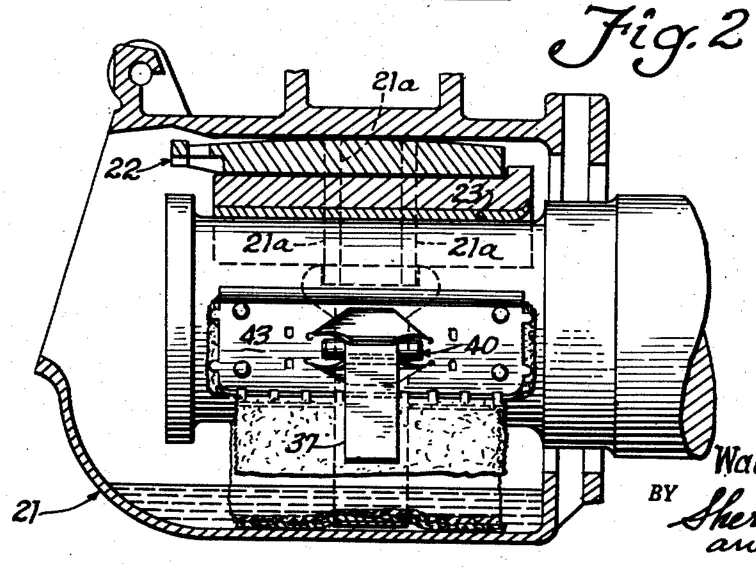
Fig. 2 is a vertical section through a journal box showing the axle and the lubricating device in elevation.

Like numerals refer to like elements throughout the drawings in which 20 illustrates a portion of a standard railway car truck 20 with which is formed or by which is carried a journal box generally indicated by numeral 21, the same being of well-known construction and provided with central vertical ribs 21a at each side wall thereof as illustrated in Figs. 1 and 2.

As is well known, the bearing block generally indicated by numeral 22 slidably engages the ribs 21a and is provided with an arcuate segment 23 of babbitt, or the like, arranged to ride upon and closely conform to the contour of the car axle 25 at the top thereof.

Figure 3:
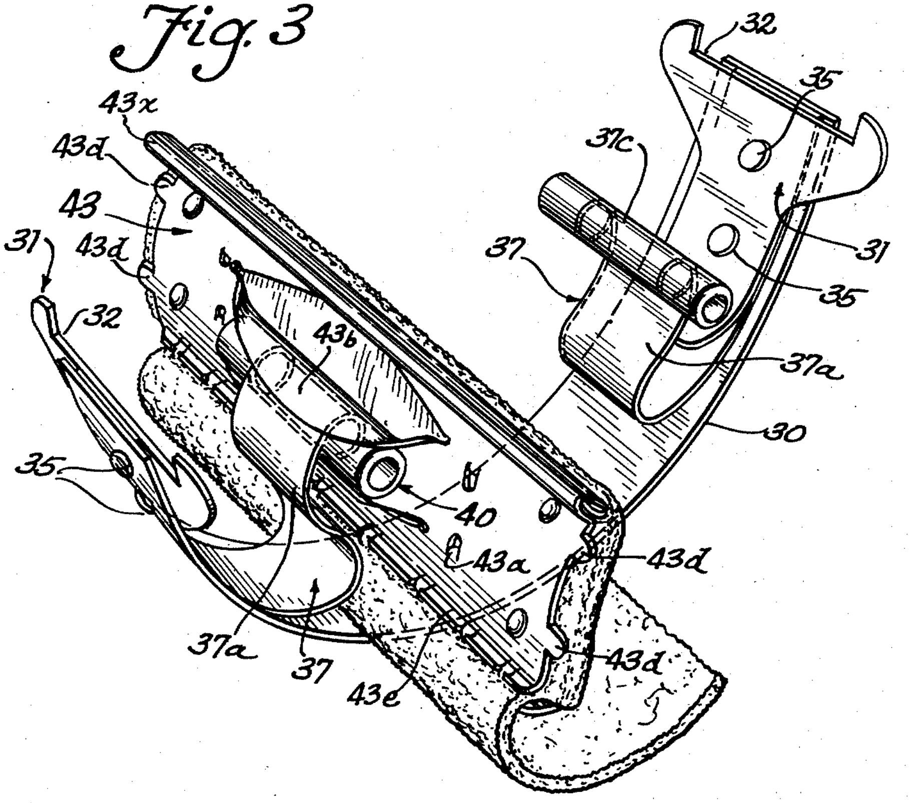
Fig. 3 is a perspective of my carrier showing one of the lubricating pad units in assembled relation and with the other omitted to illustrate the construction and arrangement of the spring arm.

My lubricating device comprises a supporting or carrier member 30 bowed or curved in shape and constructed of spring metal, as illustrated in Fig. 3, for example. Secured to each end thereof is an engaging extension 31 notched across the top as indicated by numeral 32, the width of such notch being such as to permit close engagement with the spaced ribs 21a at each side of the journal box, as illustrated in Fig. 1.

These extensions may be secured to the ends of the carrier member 30 by spot welding, or by rivets 35 or by both.

Underlying each of the extensions 31 is a spring arm generally indicated by numeral 37, best shown in Figs. 1 and 3. These arms are formed each with a reversely bent resilient portion, being formed of spring metal and a base portion 37a attached by the rivets 35 to the carrier member 32, as illustrated in Fig. 3, for example. The reversely bent spring portion of each arm projects outwardly and upwardly from the adjacent end of the carrier member 31a and is designated by numeral 37a. At its extremity, the spring arm portion 37a is looped or formed with an eye 37c. The lower ends of the extensions 31 are slightly curved at 31a to permit flexing of the arm portions 37a.

Figure 5:
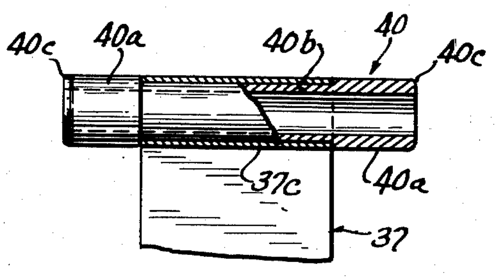
Fig. 5 is an end elevation taken along the line 5—5 of Fig. 4, a portion of the trunnion being shown in elevation.

I also provide what I term trunnion members (see Figs. 3 and 5) designated generally by numeral 40, such trunnion preferably being provided with a central bore for lightness and with shoulders 40a at each end formed to provide a reduced body portion 40b for co-extension with the width of the eye 37a whereby the shoulder portions will fit snugly against ends of such eye or loop 37c. The shoulder portions may be finished to provide a smooth surface and the outer end of each is chamfered as designated by numeral 40c. With this construction, the trunnion may be easily forced into and partially through the eye 37c, which, being free at one end and formed of resilient metal, permits sufficient spread for insertion of the trunnion as will be apparent.

Figures 6, 7:
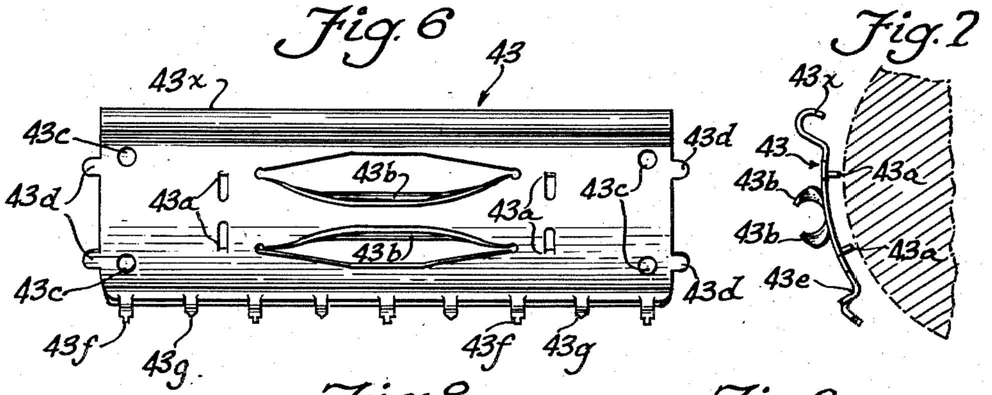
Fig. 6 is a side elevation of one form of backing plate viewed from the rear.
Fig. 7 is an end elevation of the backing member shown in relation to an indicated portion of a car axle.

What I term the lubricating pad unit or pad unit comprises generally a backing plate 43 (see Figs. 3, 6 and 7) having its face portion curved to conform to the peripheral curvature of the car axle in which it is to be used. In one form, this backing plate is provided with struck-up spurs or lugs 43a (see Figs. 6 and 7) projecting from the curved face in the plate. Bracket lugs 43b are struck out rearwardly from the plate 43b and slightly inturned and curved to form an engaging means, described later. Provision is made for securing rivets by the holes 43c and at each end are formed extending lugs 43d, shown as four in number, two at each end. At the top, the backing plate is rearwardly directed, curved and forwardly extended to provide a gripping portion or groove indicated by numeral 43x (see Figs. 4 and 7). The bottom of the backing plate 43 is rearwardly extended as indicated by numeral 43e and provided with a series of spaced lugs and spurs. The lugs 43f alternate with the spurs 43g, as shown in Fig. 6.

Figure 8:
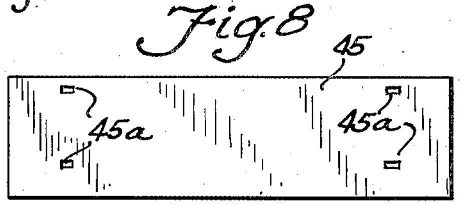
Fig. 8 is a side elevation of a filler plate used in one form of my invention.
Figure 9:
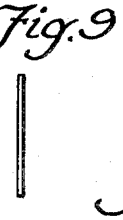
Fig. 9 is an end elevation of the same.

In one form of my invention, a filler plate 45 is provided, the same being constructed of fiber or any other suitable material (see Figs. 8 and 9). This plate is provided with the spaced apertures 45a through which the spurs 43a may extend.

Figure 11:
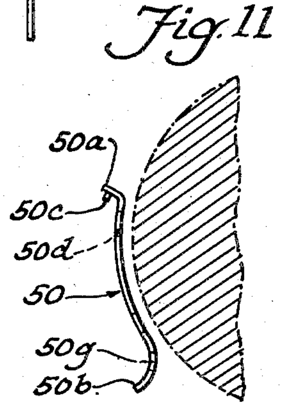

The retainer plate is generally indicated by numeral 50 (see Figs. 10 and 11) and is curved in arcuate form and in conformity with the curvature of the backing plate 43 and the periphery of the car axle with which it is to be used.

The top portion 50a is rearwardly bent or formed and the bottom portion is also rearwardly curved as indicated by numeral 50b. Along the top portion 50a of the retainer plate, lugs or spurs 50c are struck out and extend rearwardly. Rivet holes 50d are provided for alignment with the rivet holes 43c in backing plate 43. Similarly, apertures 50e are provided for alignment with the apertures 45a of the filler plate. Across the curved bottom edge portion 50b are provided spaced apertures 50f, for passage of the lugs 43f of the backing plate 43. Just above the apertures 50a is provided a longitudinal slot 50g, the purpose of which will be described later.

Figure 4:
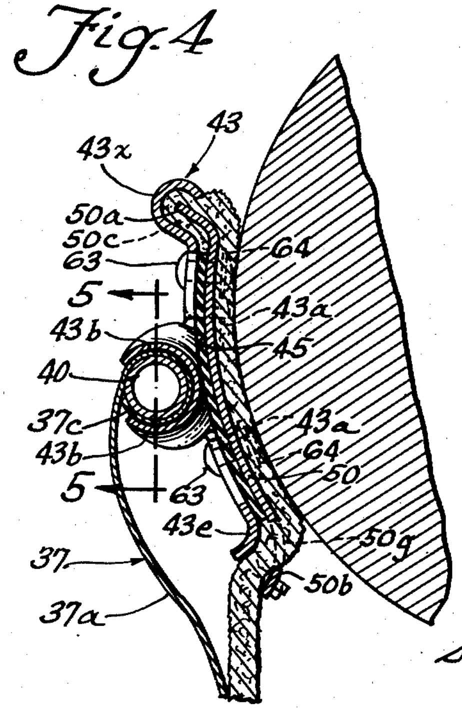
Fig. 4 is a vertical section through a portion of an axle and one of my lubricator pad units in mounted position.

In Fig. 12, I have illustrated the pad blank 60 which is formed from a sheet of so-called "terry cloth" used for turkish towels and the like. I have found this very satisfactory because of the high degree of capillarity and its resistance to disintegration. So far as I can determine, this fabric is woven with a central compact sheet or center 60a from which project laterally looped threads which are interwoven with the center sheet, the threads being designated by numeral 60b. In assembly of my lubricating device, the pad is placed against the inner curved face of the backing member 43 so that the spurs 43a penetrate the pad after which they may be clinched or headed over below the surface of the fabric to secure the pad in position. The upper end is inserted into the groove of the backing plate at the top formed by the looped portion 43d. The retainer plate 43 is mounted upon the backing plate with its upward rearwardly directed flange 50a located in the groove of the backing plate edge 43x and with the upper edge of the pad being bent around the upper edge of the retainer plate to underlie it, as illustrated in Fig. 4. Thereafter, the edge 43x of the backing plate is bent or clamped down to grip the upper edge of the pad and the retainer plate. The spurs 43a of the backing plate extend through the apertures 50e of the retainer plate and penetrate into the body of the pad, as explained above. When I find it desirable to use a filler plate 45, the same is positioned between the retainer plate and the backing plate, the apertures 45a permitting passage of the spurs 43a. At the bottom, the lugs 43f of the backing plate 43 extend through the apertures 50f of the retainer plate and are bent over to clamp the two plates together, as shown in Fig. 4. At the same time, the spurs 43f at the bottom of the backing plate 43 penetrate the body of the pad at the lower edges of the plates for added security.

The rivets 63 are extended through the rivet holes 43c of the backing plate and 50d of the retainer plate and through the body of the pad with the heads beneath the surface of the pad. Washers 64 are mounted on the rivets to compact the pad therearound after which the rivets are headed-over for further securement of the pad and plates.

It is to be noted that the pad is passed through the slot 50g of the retainer plate as illustrated in Fig. 4 and depends downwardly therefrom to lie in the sump or reservoir of the journal box 21 (see Fig. 1). It should also be pointed out that the extended side portions 60c of the pad 60 are bent around the ends of the retainer plate 50 to be gripped between the retainer plate and the backing plate 43 to form a thickened shoulder portion overlying the end lugs 43d of the backing plate as illustrated in Fig. 3, for a purpose to be hereinafter described.

To equip a journal box with my lubricating device, I first bend the ends of the carrier member 30 sufficiently to permit insertion of that member into position in the journal box with the notches 32 in engagement with the ribs 21a. Thereafter, each lubricating pad unit may be slid into proper position wherein the curved lugs 43b at the back of the backing plate engage a trunnion of the spring arm portion 37a, the construction and arrangement being such that the backing plate may freely and easily rotate about such mounting ends capable of axial movement with respect to such mounting as occasion may demand.

The construction is such that the pad will be pressed yieldingly against a surface portion of the axle, as illustrated in Fig. 1, for example, with the depending pad portions lying in the lubricant in the journal box well whereby oil will flow freely upwardly through the pad for continuous lubrication of the axle when it is rotating.

The rearward extension of the backing plate 43 and retainer plate 50 at the top with a corresponding rear deflection of the pad insures a reservoir or well at the top of the lubricating device which will serve to retain any excess oil flowing downwardly on the surface of the axle when at rest and insures immediate lubrication of the axle when rotation in either direction begins. The outward inclination of the lubricator pad at the bottom of the plates is also advantageous in preventing any substantial contact of the pad fabric with the axle where such pad is not securely gripped by or between the plates.

The securement of the pad between the plates is of such character as to restrain or prevent creeping or wrinkling of the pad where it contacts the axle, thereby insuring maximum surface contact between the pad and axle for thorough lubrication of the latter.

By utilizing a fabric of the character described for my pads, I avoid the danger of threads or ravelings being formed which, if permitted, might seriously impair the lubrication of the axle. With the looped threads tightly engaged by the center portion of the pad, there is no substantial danger of any such detrimental thread action and at the same time, I secure a high degree of capillarity for flow of the oil.

Should, for any reason, it be desired to remove one or both lubricating pad units from the journal box, this may readily be done by bending the corresponding arm or arms of the carrier away from the axle sufficiently to permit the pad unit or units to be easily slid outwardly through the door of the journal box.

In present railway car practice, there is a slight tolerance between the ends of the bearing member and the shoulders of the axle, as illustrated in Fig. 2, and since longitudinal movement of the axle occurs when the car is in motion as when rounding a curve, unless these shoulders are lubricated, the ends of the bearing will become worn in time and that tolerance increases to a point where regulations require replacement of the bearing.

The ends of my lubricator pad formed by the overturning of the pad insure a lubrication of either shoulder or axle if there be movement between the axle and the bearing sufficient to bring the latter into contact with the former. When such movement occurs, one end or the other of the pad will first contact the shoulder being prevented from collapse by the lugs **43*d* of the backing plate 43**.

With the construction described above, it will be apparent that I have insured accurate end placement of the carrier member and thereby of the lubricating pad relative to an axle and have also insured retention of the pad unit in the proper location under operating conditions, such movement of the pad unit as is desirable being permitted by the construction described, i. e. the spring arm members 37 and the slidable engagement of the backing plate lugs **43*b* with the trunnions 40**.

In the form illustrated in Figs. 1 to 10, I may find it desirable to use the filler plate 45 to compensate for what would otherwise be a space between the retainer plates 50 and the backing plates 43 due to the interposition of portions of the lubricating pad. This is best illustrated in Fig. 4 of the drawings.

In Figs. 14 to 18, inclusive, I have illustrated a modified form of lubricating pad unit generally similar in form, construction and assembly to that of the form of Figs. 1 to 10 of the drawings. In this modified form of device, the backing plate 143 is raised throughout its major portion as by stamping to form the offset portion **43*x* so that throughout the area of the raised portion, it will lie in close contact with the outer surface of the associated retainer plate 150 to compensate for interposed portions of the pad as illustrated, for example, in Figs. 16 and 17. In other respects, the construction is generally similar, as stated, to that of the form of Figs. 1 to 10, save that I have omitted the rivets and have provided more engaging spurs 143*a***.

In Figs. 19 to 22 inclusive, I have illustrated a modified form of pad comprising a backing plate 243 generally similar to backing plate 43 of the construction of the other figures.

The reversely directed upper edge portion indicated by numeral **243*x* is provided with a transverse row of depressions or dimples 243*y*** (see Figs. 20, 21).

Spurs and lugs are provided, corresponding to spurs **43*g* and lugs 43*f* of the construction of Figs. 1, 2, etc., and are generally similar except that they are of greater length to compensate for greater thickness of fabric. One of these lugs 243*f*** is illustrated in Fig. 20 as it appears after engagement with the retainer plate.

Figure 10:
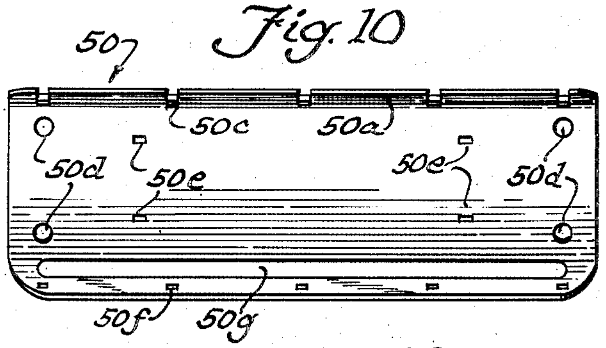
Fig. 10 is a side elevation of one form of my retainer plate.

The retainer plate 250 is likewise generally similar to retainer plate 50 of the first described construction as shown, for example, in Fig. 10, differing in that the upper rearwardly directed edge **250*a* is serrated across the top as indicated by numeral 250*x***.

In lieu of a one-piece fabric of the contour illustrated in Fig. 12, for economy and incidental advantages and use, I have provided an integrated arrangement comprising the main fabric strip 260 and a transverse fabric strip 261 which is secured below the upper edge of the main strip 260 by means of hollow grommets 262 extending through and securing the two fabric strips in close relation.

At its ends, the transverse strip 261 may be provided with holes **261*a* for passage of the grommets or eyelets 262**.

In the assembly of the pad unit, the main fabric strip 260, at its upper edge portion, is extended around the serrated edge **250*x* of the retainer plate and reversely directed therebeneath to the lower edge of the backing plate 243 as shown in Fig. 20. Rivets 264 pass through the holes in the grommets 262 and aligned holes in the retainer and backing plates, being headed over to secure all of the elements in closely assembled relation. These rivets are preferably of some soft metal, as aluminum, to preclude wear of an axle should contact therewith occur. The main fabric strip is extended through the slot in the bottom of the retainer plate 250** as in the earlier described construction, but is of greater length so that it may not only extend to or close to the bottom of a journal box, but also may be reversely bent or doubled so that its edge portion may be clamped between the bottom of the retainer plate and the bottom of the backing plate as shown in Fig. 20. The lugs and spurs extend into both thicknesses of the pad, the former extending through as shown in the drawing for engagement with and gripping of the retainer plate 250. With this construction, I obtain a very much increased flow of oil due to the increased capillarity and capacity of the double fabric strip.

The projecting ends of the transverse strip 261 are bent around the ends of the retainer plate as in the earlier described construction to form the axle shoulder lubricating means described as shown in the other illustrated forms of the invention.

Insofar as the disclosure of this application is common to the disclosure of my earlier filed application Serial No. 661,416, filed April 11, 1946, now Patent No. 2,559,041 I claim the benefit of the filing date of the earlier filed application.

It will be apparent that my invention is susceptible of modification and departure from the specific forms illustrated and described but I do not wish to be restricted to such forms except as the appended claims, properly interpreted with respect to the prior art, may impose such restriction.

What I claim is:

1. A supporting member for lubricating pads comprising a bowed member constructed and arranged resiliently to contact the sides of the bottom of a journal box and having projecting free ends, a member secured to each of said free ends and projecting upwardly, said member being provided with a notched portion for slip engagement with the lug or rib of a journal box, and a resilient arm at each free end of said supporting member and means to secure said members and said supporting arms to said supporting member.

2. A supporting member for lubricating pads comprising a bowed member constructed and arranged resiliently to contact the sides of the bottom of a journal box and having projecting free ends, an engaging member secured to each of said free ends and projecting upwardly, said engaging member being provided with a notched portion for slip engagement with the lug or rib of a journal box, and a resilient arm underlying said engaging member at each free end of said supporting member and having a reversely bent portion, and means to secure said members and said supporting arms to said supporting member, said engaging member being inwardly curved on its lower extremity to permit flexing of the underlying portion of said spring arm.

3. A lubricating device comprising a supporting member insertable in a journal box and provided with means for engagement with internal ribs in said journal box, a spring arm secured adjacent each end of said supporting member and having a free resilient portion, said resilient portion being provided with a loop, a trunnion member carried by said loop and a pad unit including a plate with engaging portions slidable and rotatable upon said trunnion member.

4. A lubricating device comprising a supporting member bowed to form free end portions, a spring arm secured to each of the ends of said supporting member and having a free resilient portion, a trunnion carried by said resilient portion, and a pad unit comprising a backing plate, a fabric pad carried thereby with a depending portion, and means to secure said pad to said backing plate, said backing plate being provided with rearwardly extending lugs constructed for sliding and rotative engagement with said trunnion.

5. A supporting member for an axle lubricating device comprising a body portion and extending free ends, said member being constructed for insertion into a journal box for resilient engagement with the sides and bottom thereof, a spring arm carried by each of said ends of said supporting member and provided with a free resilient portion, said portion terminating in a loop, and trunnion members each provided with terminal shoulders and mounted in one of said loops, said shoulders being of an outside diameter substantially equal to that of the carrying loop.

6. A lubricating device comprising a supporting member insertable in a journal box, means to secure said supporting member in proper location in said journal box, a spring arm projecting from said supporting member adjacent each end thereof, each of said spring arms being provided with a loop portion, a trunnion mounted in each of said loop portions, a plate provided with means projecting therefrom slidably and rotatively engaging each said trunnion, a lubricating pad carried by and secured to each said plate and having a portion depending therefrom, and means to secure each said pad to its associated said plate comprising a plate-like retainer and means to grip said pad between said plate and said retainer.

7. A lubricating device comprising a supporting member insertable in a journal box, means to secure said supporting member in proper location in said journal box, a spring arm projecting from said supporting member adjacent each end thereof, each of said spring arms being provided with a loop portion, a trunnion mounted in each of said loop portions, a plate provided with means projecting therefrom slidably and rotatively engaging each said trunnion, a lubricating pad carried by and secured to each said plate and having a portion depending therefrom, means to secure each said pad to its associated said plate comprising a plate-like retainer and means to grip said pad between said plate and said retainer, each said plate being provided with end extending portions, and each said pad being extended at its ends to overlie said extending portions.

8. A lubricating device comprising a supporting member insertable in a journal box, means to secure said supporting member in proper location in said journal box, a spring arm projecting from said supporting member adjacent each end thereof, each of said spring arms being provided with a loop portion, a trunnion mounted in each of said loop portions, a plate provided with means projecting therefrom slidably and rotatively engaging each said trunnion, a lubricating pad carried by and secured to each said plate and having a portion depending therefrom, means to secure each said pad to its associated said plate comprising a plate-like retainer and means to grip said pad between said plate and said retainer, each said plate being provided with end extending portions, and each said pad being extended at its ends to overlie said extending portions and being reversely directed between said retainer and said backing plate at such ends.

9. A lubricating pad unit for railway car axles and the like comprising a backing plate and a retainer plate, a fabric pad member having a portion interposed between said plates and a portion depending therefrom, means to secure said plates and pad in assembled relation including lugs extending from said backing plate through said retainer plate and into said fabric portion.

10. A lubricating pad unit for railway car axles and the like comprising a backing plate and a retainer plate, a fabric pad member having a portion interposed between said plates and a portion depending therefrom, means to secure said plates and pad in assembled relation including lugs extending from said backing plate through said retainer plate and into said fabric portion, said lugs being bent to engage said pad portion and to terminate beneath the outer surface thereof.

11. A lubricating pad unit for railway car axles and the like comprising a backing plate and a retainer plate, a fabric pad member having a portion interposed between said plates and a portion depending therefrom, means to secure said plates and pad in assembled relation including lugs extending from said backing plate through said retainer plate and into said fabric portion, said retainer plate being curved to conform to the contour of an axle to which it may be applied.

12. A lubricating pad unit for railway car axles and the like comprising a backing plate and a retainer plate, a fabric pad member having a portion interposed between said plates and a portion depending therefrom, means to secure said plates and pad in assembled relation, said retainer plate being slotted adjacent the bottom edge thereof and said downwardly extending portion of said pad being passed therethrough.

13. A lubricating pad unit for railway car axles and the like comprising a backing plate and a retainer plate, a fabric pad member having a portion interposed between said plates and a portion depending therefrom, means to secure said plates and pad in assembled relation, said backing plate having its upper edge portion curved to provide a groove, said retainer plate having its upper edge extending into said groove, the upper edge of said pad being extended into said groove and secured therein by said upper edge of said retainer plate.

14. A lubricating pad unit for railway car axles and the like comprising a backing plate and a retainer plate, a fabric pad member having a portion interposed between said plates and a portion depending therefrom, means to secure said plates and pad in assembled relation, said backing plate having its upper edge portion curved to provide a groove, said retainer plate having its upper edge extending into said groove, the upper edge of said pad being extended into said groove and secured therein by said upper edge of said retainer plate, said grooved upper edge portion of said backing plate being rearwardly inclined.

15. A lubricating pad unit for railway car axles and the like comprising a backing plate and a retainer plate, a fabric pad member having a portion interposed between said plates and a portion depending therefrom, means to secure said plates and pad in assembled relation, said backing plate having its upper edge portion curved to provide a groove, said retainer plate having its upper edge extending into said groove, the upper edge of said pad being extended into said groove and secured therein by said upper edge of said retainer plate, said grooved portion of said backing plate being constricted to grip the upper edge of said pad in assembled relation.

16. A lubricating pad unit for railway car axles and the like comprising a backing plate and a retainer plate, a fabric pad member having a portion interposed between said plates and a portion depending therefrom, means to secure said plates and pad in assembled relation, said backing plate having its upper edge portion curved to provide a groove, said retainer plate having its upper edge extending into said groove, the upper edge of said pad being extended into said groove and secured therein by said upper edge of said retainer plate, said grooved portion of said backing plate being constricted to grip the upper edge of said pad in assembled relation, and a filler plate mounted between said retainer plate and said backing plate.

17. A lubricating pad unit for railway car axles and the like comprising a backing plate and a retainer plate, a fabric pad member having a portion interposed between said plates and a portion depending therefrom, means to secure said plates and pad in assembled relation, said backing plate having its upper edge portion curved to provide a groove, said retainer plate having its upper edge extending into said groove, the upper edge of said pad being extended into said groove and secured therein by said upper edge of said retainer plate, said grooved portion of said backing plate being constricted to grip the upper edge of said pad in assembled relation, a filler plate mounted between said retainer plate and said backing plate, rivets being extended through said plates, each having an end terminating beneath the outer surface of said fabric pad.

18. A lubricating pad unit for car axles and the like comprising a backing plate, a retainer plate and a fabric pad having a portion located between said plates and a portion depending therefrom, said backing plate being provided with a grooved upper edge portion, said retainer plate having its upper edge inserted in said grooved portion, the upper edge of said fabric pad being located in said grooved portion and secured therein by said retainer plate, said plate being provided with pad engaging means at its upper edge.

19. A lubricating pad unit for car axles and the like comprising a backing plate, a retainer plate and a fabric pad having a portion located between said plates and a portion depending therefrom, said backing plate being provided with a grooved upper edge portion, said retainer plate having its upper edge inserted in said grooved portion, the upper edge of said fabric pad being located in said grooved portion and secured therein by said retainer plate, said plate being provided with pad engaging means at its upper edge, said backing plate being additionally provided with a rearwardly extending flange at its lower edge and means to engage the retainer plate adjacent its lower edge.

20. A lubricating pad unit for car axles and the like comprising a backing plate, a retainer plate and a fabric pad having a portion located between said plates and a portion depending therefrom, said backing plate being provided with a grooved upper edge portion, said retainer plate having its upper edge inserted in said grooved portion, the upper edge of said fabric pad being located in said grooved portion and secured therein by said retainer plate, said plate being provided with pad engaging means at its upper edge, said backing plate being additionally provided with a rearwardly extending flange at its lower edge and means to engage the retainer plate adjacent its lower edge, said backing plate being further provided with lugs extending forwardly from its front surface for penetration of and engagement with said fabric pad.

21. A lubricating pad unit for car axles and the like comprising a backing plate, a retainer plate and a fabric pad having a portion located between said plates and a portion depending therefrom, said backing plate being provided with a grooved upper edge portion, said retainer plate having its upper edge inserted in said grooved portion, the upper edge of said fabric pad being located in said grooved portion and secured therein by said retainer plate, said plate being provided with pad engaging means at its upper edge, said backing plate being additionally provided with a rearwardly extending flange at its lower edge and means to engage the retainer plate adjacent its lower edge, said backing plate being further provided with lugs extending forwardly from its front surface for penetration of and engagement with said fabric pad, said retainer plate being provided with a longitudinal slot adjacent its lower edge, said depending portion of said pad being passed therethrough.

22. A lubricating pad unit comprising a backing plate and a retainer plate, a lubricating pad secured between said plates with a portion depending therefrom, means to secure said plates and pad in assembled relation, said backing plate being being provided with extending portions at each end, said pad having its sides overlying said extending portions.

23. A lubricating pad unit comprising a backing plate and a retainer plate, a fabric pad having portions secured to and between said plates to provide a lubricating portion and a freely depending portion, the upper and lower edge portions of said pad being secured between said plates, said backing plate being provided with an offset body portion lying adjacent the rear face of said retainer plate.

24. A lubricating pad unit comprising a main fabric strip of an absorbent character, means comprising a backing plate and a retainer plate engaging and securing a portion of said fabric strip, said strip being provided with a portion depending from said plates and doubled back, the extremity of said doubled backed portion being secured between said plates.

25. A lubricating pad unit comprising a main fabric strip of absorbent material, a transverse strip of the same material, said transverse strip being secured to said main strip and having its end portions projecting therebeyond, carrying means comprising a backing plate and a retainer plate, a portion of said main and transverse strips being secured thereto and thereby, said extended portions of said transverse strip being bent around to enfold the ends of one of said plates.

26. A lubricating pad unit comprising a main fabric strip of absorbent material, a transverse strip of the same material, said transverse strip being secured to said main strip and having its end portions projecting therebeyond, carrying means comprising a backing plate and a retainer plate, a portion of said main and transverse strips being secured thereto and thereby, said extended portions of said transverse strip being bent around to enfold the ends of one of said plates, said fabric strips being secured together by hollow grommets, and rivets extending through said grommets and plates and securing said strips and plates in assembled relation.

27. A lubricating pad unit comprising an absorbent fabric strip, a retainer plate and a backing plate, a portion of said fabric being secured thereto, the upper edge of said retainer plate being serrated and said fabric strip being bent therearound and the said backing plate being provided with a reversely directed flange at its upper edge portion receiving said serrated edge of said retainer plate and clamping said pad and retainer plate in assembled relation.

28. A lubricating pad unit comprising an absorbent fabric strip, a retainer plate and a backing plate, a portion of said fabric being secured thereto, the upper edge of said retainer plate being serrated and said fabric strip being bent therearound and the said backing plate being provided with a reversely directed flange at its upper edge portion receiving said serrated edge of said retainer plate and clamping said pad and retainer plate in assembled relation, said reversely bent upward flange of said backing plate being provided with depressions to contribute to the clamping securement of said fabric.

WALDEMAR H. KORN.

References Cited in the file of this patent

UNITED STATES PATENTS

| Number | Name | Date |
|---|---|---|
| 814,152 | Mooney | Mar. 6, 1906 |
| 2,348,911 | Korn | May 16, 1944 |

FOREIGN PATENTS

| Number | Country | Date |
|---|---|---|
| 259,509 | Germany | May 6, 1913 |